(12) United States Patent
Urresty et al.

(10) Patent No.: US 11,837,918 B2
(45) Date of Patent: Dec. 5, 2023

(54) MAGNETS IN ELECTRICAL MACHINES (71) Applicant: General Electric Renovables Espana, S.L., Barcelona (ES)

(72) Inventors: Julio Cesar Urresty, Barcelona (ES); Mikhail Avanesov, Garching (DE); Neus Galles Raventos, Barcelona (ES); Ross Hall, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 77 days.

(21) Appl. No.: 17/518,634

(22) Filed: Nov. 4, 2021

(65) Prior Publication Data

US 2022/0149680 A1    May 12, 2022

(30) Foreign Application Priority Data

Nov. 6, 2020 (EP) .................................. 20382964

(51) Int. Cl.
*H02K 1/27* (2022.01)
(52) U.S. Cl.
CPC ..................................... *H02K 1/27* (2013.01)
(58) Field of Classification Search
CPC ............. H02K 1/27; H02K 21/24; H02K 1/32
See application file for complete search history.

(56) References Cited

U.S. PATENT DOCUMENTS

| 7,884,522 | B1 * | 2/2011 | Petro | ....................... | H02K 16/00 |
| | | | | | 310/216.073 |
| 10,505,405 | B2 | 12/2019 | Tachtler et al. | | |
| 2007/0284960 | A1 * | 12/2007 | Fulton | ..................... | H02K 1/278 |
| | | | | | 310/156.01 |
| 2008/0303368 | A1 * | 12/2008 | Rahman | ............... | H02K 1/2766 |
| | | | | | 310/156.56 |
| 2010/0213885 | A1 * | 8/2010 | Ichiyama | ............... | H02K 21/12 |
| | | | | | 310/156.46 |
| 2012/0262019 | A1 | 10/2012 | Smith et al. | | |

(Continued)

FOREIGN PATENT DOCUMENTS

DE    102013225396 A1    6/2015
EP       2533403 A1    12/2012

(Continued)

OTHER PUBLICATIONS

European Search Report Corresponding to EP20382964 dated Apr. 13, 2021.

(Continued)

*Primary Examiner* — Quyen P Leung
*Assistant Examiner* — Masoud Vaziri
(74) *Attorney, Agent, or Firm* — Dority & Manning, P.A.

(57) ABSTRACT

The present disclosure relates to rotors for an electrical machine comprising a first type of permanent magnets, and a second type of permanent magnets, wherein the first and the second types of permanent magnets have a same magnetic strength, and wherein the first type of permanent magnets has a first temperature rating, and the second type of permanent magnets has a second temperature rating different from the first temperature rating. The present disclosure relates to generators, and in particular to wind turbines comprising such generators and to methods for selecting or providing magnets for permanent magnet rotors.

12 Claims, 6 Drawing Sheets

(56) References Cited

U.S. PATENT DOCUMENTS

| | | | |
|---|---|---|---|
| 2012/0299408 A1* | 11/2012 | Higuchi | .............. H02K 1/32 |
| | | | 310/63 |
| 2013/0270949 A1 | 10/2013 | Gracia et al. | |
| 2018/0351425 A1* | 12/2018 | Muñiz Casais | .......... H02K 1/32 |

FOREIGN PATENT DOCUMENTS

| | | |
|---|---|---|
| EP | 3001542 A1 | 3/2016 |
| EP | 3413440 A1 | 12/2018 |
| EP | 3149835 B1 | 7/2019 |
| WO | WO2014102751 A2 | 7/2014 |
| WO | WO2015183379 A1 | 12/2015 |

OTHER PUBLICATIONS

E-Cooling, Electronic Cooling Solutions, 6 Pages. Retrieved Oct. 20, 2021 from weblink: http://www.e-cooling.de/en/index.htm.

\* cited by examiner

MAGNETS IN ELECTRICAL MACHINES

The present disclosure relates to electrical machines and more particularly relates to electrical machines including permanent magnets. The present disclosure also relates to wind turbines comprising such electrical machines, and in particular to wind turbines comprising permanent magnet generators with cooling arrangements.

BACKGROUND

Electrical machines, such as motors and generators, generally comprise a rotor structure and a stator structure. Large electrical generators may be e.g. permanent magnet excited generators (PMG).

Such generators may be used for example in wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators may also be coupled to a gearbox which increases the rotational speed of the generator to for example between 50 to 500 rpm or even more.

Electrical machines comprise a rotor which rotates with respect the stator. The rotor may be the inner structure and the stator the outer structure. The stator in this case thus surrounds the rotor. Alternatively, the configuration may be opposite to this, i.e. the rotor surrounds the stator.

In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies. This is an important reason why permanent magnet generator are employed in offshore wind turbines, and particularly in direct drive offshore wind turbines.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor rim in such a way that the plurality of magnets are fixed together to the rotor rim through the module base. The use of permanent magnet modules may facilitate the manufacturing of a rotor.

Cooling is generally important in electrical machines, since the active elements (magnets or coils) heat up in use. A too high temperature can lead to failure of these elements and to less efficient operation.

Different configurations for electrical machines are known e.g. radial machines and axial machines. In axial machines, rotor and stator axially face each other. The air gap is axially arranged in between rotor and stator. In radial machines, a substantially annular air gap may be formed between rotor and stator. And one of the rotor and stator is arranged to radially surround the other. Due to the motion of the rotor, the air in the air gap is moved around. The air hereby can provide a cooling effect, particularly in the case of high speed rotation.

It is known to provide an active air cooling or air conditioning system which provides a cold air flow through an inner stator structure. The cooling air flow is then distributed along the circumference of the stator. The air flow then axially crosses the air gap from one side to the other, thereby cooling the active elements of the rotor and stator. The hot air is then collected at the opposite axial side. The hot air may then be exhausted or cooled in a heat exchanger and be used again. This type of cooling, in which the cooling air crosses the radial air gap axially is generally denoted as axial cooling.

Radial cooling, in which cooling air is blown radially in the radial air gap, usually at various points along the axial length of the rotor, is also known. Axial cooling is generally preferred for axially shorter electrical machines, whereas radial cooling is often preferred for axially longer electrical machines.

With cooling air crossing the air gap axially from one side to the other, the air heats up as it passes through the air gap. The cooling air is thus cooler on one side than on the opposite side, and thus provides more effective cooling on one side than on the other. The result is that cooling of the active elements is not homogeneous, i.e. magnets on one side of a rotor may be at a higher temperature than magnets at the other side.

An inhomogeneous temperature distribution among magnets can affect the operation of the electrical machine. Demagnetization is a process in which permanent magnets loose their magnetic properties. Demagnetization occurs in the presence of a strong magnetic field, e.g. a magnetic field caused by stator currents, and particularly fault currents in an electrical machine. Demagnetization of permanent magnets may thus occur during use and over the lifetime of an electrical machine, and demagnetization occurs more rapidly and to a larger extent at high temperatures.

If the temperature distribution is axially inhomogeneous as described before, the magnets arranged on one side of the rotor can experience more demagnetization and can experience demagnetization more rapidly than magnets arranged on the other side of the rotor.

The size and type of electrical machines and the potential problems described herein are not limited to generators in direct drive applications, and not even to the field of wind turbines only. Electrical machines of considerable dimensions that may suffer from the same problems and/or have the same complications may also be found e.g. in steam turbines and water turbines.

The present disclosure provides examples of systems and methods that at least partially resolve some of the aforementioned disadvantages.

SUMMARY

In a first aspect, a rotor for an electrical machine comprising a first type of permanent magnets, and a second type of permanent magnets. The first and the second types of permanent magnets have a same magnetic strength, and wherein the first type of permanent magnets has a first temperature rating, and the second type of permanent magnets has a second temperature rating different from the first temperature rating.

In accordance with this aspect, a permanent magnet rotor is provided which can account for an inhomogeneous temperature distribution along the rotor. Demagnetization of permanent magnets can occur e.g. when a fault current occurs. In order to avoid demagnetization, permanent magnets are usually selected that are of a "grade" (a combination of strength and temperature rating) that is high enough to avoid demagnetization even for the magnets at the highest temperature. Magnets of higher grades however are more expensive than lower grade magnets. A known solution is to increase cooling of the permanent magnet rotor to thereby lower the grade of the magnets. In accordance with the aforementioned aspect however, different grades of magnets may be used for different areas with different temperatures, thereby providing a cost-effective solution.

Throughout the present disclosure, a different temperature rating means a different intrinsic coercivity. Coercivity or magnetic coercivity is a measure of the ability of a ferromagnetic material to withstand an external magnetic field without becoming demagnetized. Coercivity is usually measured in oersted or ampere/meter units and is denoted $H_C$. A larger value is the intrinsic coercivity $H_{Ci}$ which does not take into account the negative vacuum permitivity contribution to the magnetic field B, only considering the magnetization.

Throughout the present disclosure, a strength of a permanent magnet may be regarded as its magnetic remanence. Remanence or remanent magnetization or residual magnetism is the magnetization left behind in a ferromagnetic material when an external magnetic field is removed. The same magnetic remanence or same magnetic strength as used throughout the present disclosure shall mean that a difference in magnetic remanence between one magnet and another is less than 10%, specifically less than 5%.

In a further aspect, a method is provided which comprises determining a magnetic remanence for permanent magnets of a permanent magnet rotor of an electrical machine, and determining a temperature distribution of the permanent magnet rotor in operation. The method then comprises determining a first zone of the permanent magnet rotor with a higher average temperature, and determining a second zone of the permanent magnet rotor with a lower average temperature. Then, a first type of magnet for the first zone and a second type of magnet for the second zone are selected, wherein the second type is different from the first type.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
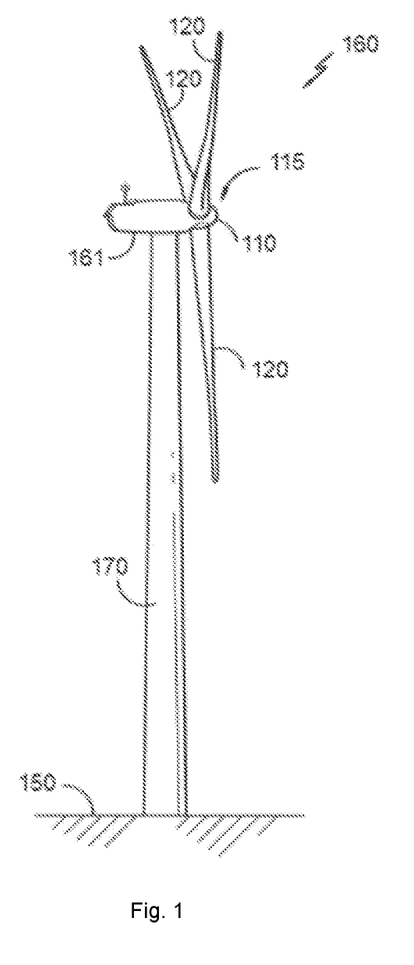
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
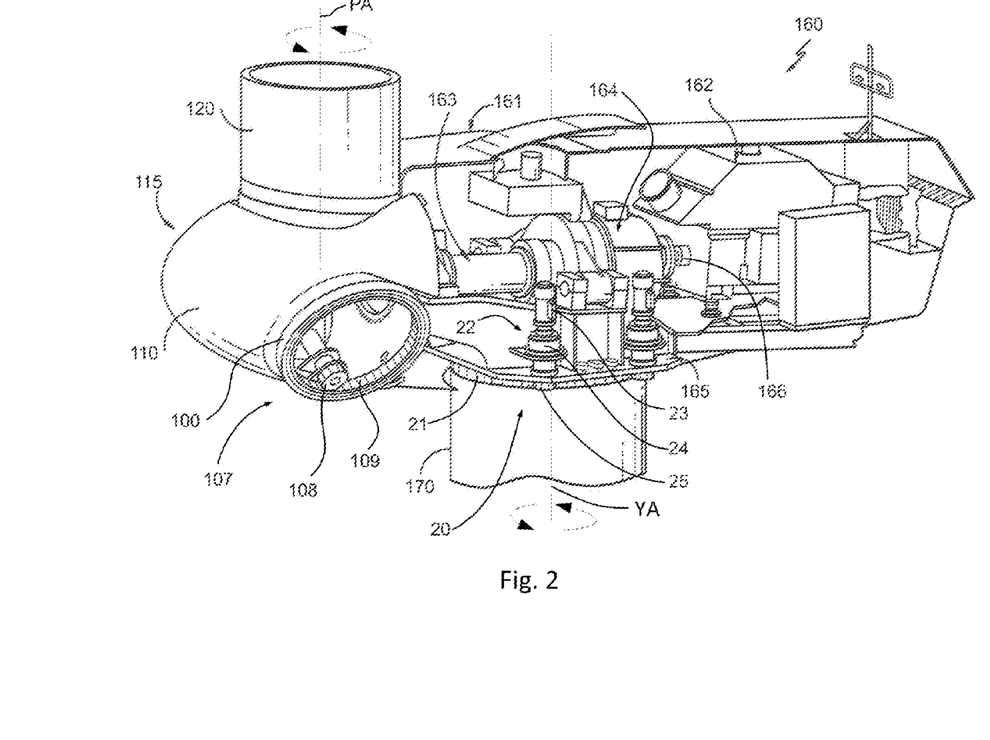
FIG. 2 illustrates a detailed, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

The energy produced by the generator may be delivered to a converter which adapts the output electrical power of the generator to the requirements of the power grid. The electrical machine may comprise electrical phases, e.g. three electrical phases. The converter may be arranged inside the nacelle or inside the tower or externally.

Figure 3:
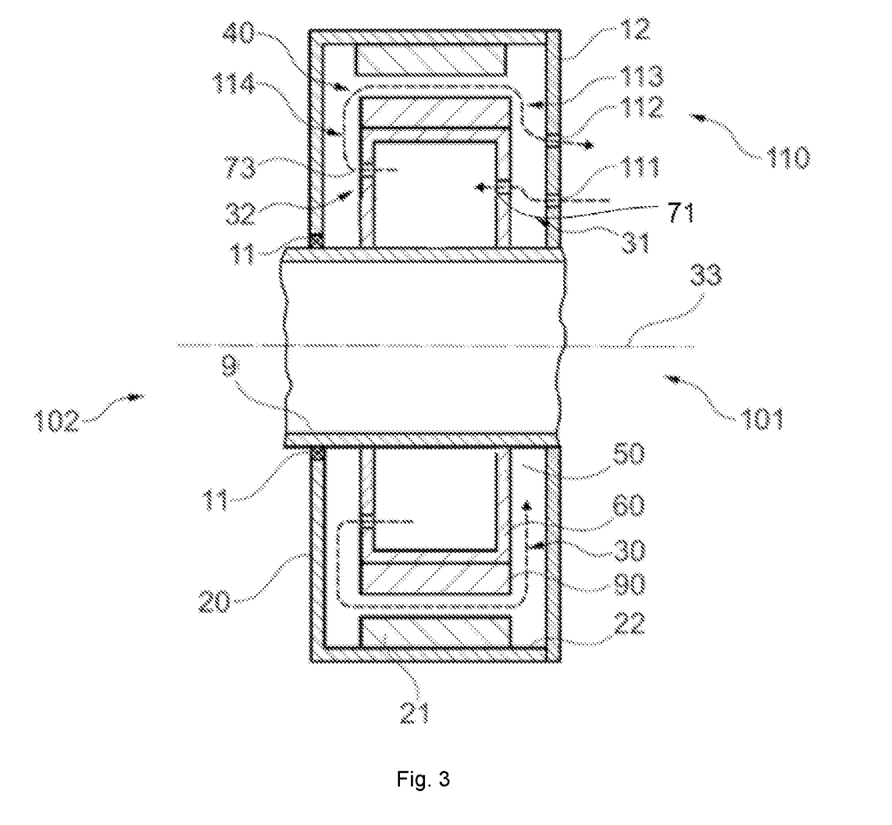
FIG. 3 schematically represents a cross-sectional view of an example of an electrical machine.

FIG. 3 schematically illustrates an electrical machine. The electrical machine may be an electrical generator, specifically a direct drive wind turbine generator.

The electrical generator 10 of FIG. 3 comprises a rotor 20 extending from a first side 101 to a second side 102 and configured to rotate about a rotational axis 33, a stator 30, an air gap 40 between the rotor 20 and the stator 30.

The stator 30 of this figure comprises a plurality of electrical coils 90 and a stator structure 50 comprising a circumferential support 60 supporting the plurality of electrical coils 90. The stator structure 50 extends from a first side 31 to a second side 32 along the rotational axis 33 of the electrical generator.

The electrical generator 10 of FIG. 3 further comprises an air-cooling system 110 to cool the plurality of electrical coils 90. In this example, the air-cooling system 110 comprises an electrical machine air inlet 111, an air distribution channel extending through a portion of the circumferential support 60 and an electrical machine air outlet 112 in fluid communication with the air gap 40. The electrical machine air inlet may allow an air flow to enter into the electrical machine.

Cooling air delivered by the air cooling system 110 may provide cold air to air gap 40. This air can thereby cool the electromagnetic elements arranged along the air gap, e.g. magnets 21 arranged with the rotor 20 and also the electrical coils 90 arranged on the stator.

The air distribution channel of this example comprises an air entrance 71 in fluid communication with the electrical machine air inlet 111 and being arranged at the first side 31 of the circumferential support 60 and. The air distribution channel further comprises a plurality of axial air openings 73 arranged at the second side 32 of the circumferential support 60 in fluid communication with the air gap 40 to distribute an air flow from the electrical machine air inlet 111 along the air gap 40.

In the electrical generator 10 of this specific example, the rotor 20 surrounds the stator 30. The rotor is rotatably mounted on a supporting frame 9 of a wind turbine through a generator bearing 11. The rotor 20 may be connected to a rotor hub of a wind turbine (not shown in this figure) which causes it to rotate. The stator 30 may be rigidly connected to a supporting frame 9 of a wind turbine. The electrical windings 90 are arranged on an outer side of an external rim of the circumferential support and magnets or magnet modules 21 may be arranged on an inner side of an external rotor rim 22.

In the example of this figure, the electrical generator comprises a cover plate 12 arranged at the first side 101. The cover plate 12 may close the electrical generator and may be fixedly attached to supporting frame 9 of a wind turbine. A sealing member may be arranged between a portion of the rotor rim 22 close to the first side 101 and the cover plate 12.

In other examples, the cover plate 12 may form part of the rotor 20. In some of these examples, an additional generator bearing may rotatably connect the cover plate with the supporting frame of a wind turbine. In other examples, the rotor 20 may be radially inside of the stator, i.e. the stator 30 may radially surround the rotor 20. The rotor 20 may be directly coupled to the wind turbine rotor (e.g. to the rotor shaft or rotor hub), or a gearbox may be arranged between the wind turbine rotor and the generator.

Cold air flow may enter into the electrical generator 10 through the electrical machine air inlet 111. This cold air flow may be guided through the stator structure 50 and the plurality of axial air openings 73 towards the air gap 40 of the electrical generator 10. The air flow may thus be substantially uniformly distributed along the circumference of the air gap 40. This cold air flow may thus cool down the electromagnetic components of the rotor and of the stator arranged at the air gap 40. The air flow may axially pass through the air gap from the second side 102 to the first side 101 to cool down the electromagnetic components arranged at the air gap. Heat from the electromagnetic components is transferred to the air flow and the temperature of the air flow at the first side 101 may be higher than at the second side 102. This hot air flow may then exit the electrical generator through the electrical machine air outlet 112 to be cooled down in a heat exchanger. The electrical machine air outlet may allow an air flow to exit the electrical machine.

The electromagnetic components, e.g. magnets, arranged at the air gap may thus operate at a temperature within a predetermined suitable range and the electrical machine may thus efficiently operate.

The air-cooling system according to this figure, comprises a second side radial air channel 114 radially extending between the second side 32 of the circumferential support 60 and the second side 102 of the rotor 20. The second side radial air channel 114 may communicate the plurality of axial air openings 73 with the air gap 40.

The air-cooling may comprise a first side radial air channel 113 radially extending between the first side 31 of the circumferential support 60 and the first side 101 of the rotor 20. The first side radial air channel 113 may communicate the air gap 40 with the electrical machine air outlet 112.

In some examples, the cooling system may comprise a heat exchanger. The heat exchanger may comprise a first fluid circuit and a second fluid circuit. The first fluid circuit may be connected to the cooling system to cool the electrical machine. The second fluid circuit may cool the fluid flowing along the first fluid circuit. The fluid of the second fluid circuit may be for example air or water. The first fluid circuit may comprise a heat exchanger air inlet connected to the electrical machine air outlet to receive a warm air flow from the air gap. In addition, the first fluid circuit may comprise a heat exchanger air outlet connected to the electrical machine air inlet to deliver an air flow to the air gap. A conduit may be arranged between the electrical machine air outlet and the heat exchanger air inlet to guide the air flow towards the heat exchanger. A conduit may connect the heat exchanger air outlet to the electrical machine air inlet.

Air flow from the air gap may be cooled down by the second fluid circuit and this cooled air flow may be inputted to the electrical machine through the electrical machine air inlet to cool down the electromagnetic components arranged on the air gap.

As mentioned before, the cold air flow may thus cool down the electromagnetic components of the rotor and of the stator arranged at the air gap 40. The air flow may axially pass through the air gap from the second side 102 to the first side 101 to cool down the electromagnetic components arranged at the air gap. Heat from the electromagnetic components is transferred to the air flow and the temperature of the air flow at the first side 101 may be higher than at the second side 102. Since the temperature of the (cooling) air flow may be higher at the first side 101, the cooling of the magnets at this side of the electrical machine is done with warmer air. Cooling may thus be less effective locally.

The magnets 21 at the warm side may thus operate at a higher temperature than the magnets at the cooler side of the rotor.

Figure 4A:
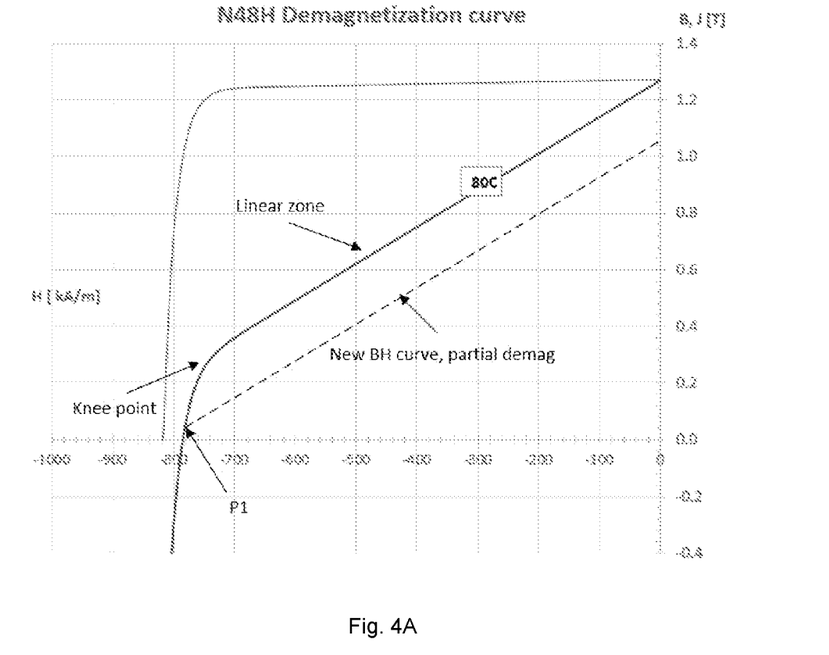
FIGS. 4A and 4B schematically illustrates demagnetization curves.

FIG. 4A illustrates a demagnetization curve 205 of a permanent magnet, specifically a neodymium iron boron magnet. Demagnetization curve 205 is the "normal" demagnetization curve, whereas "intrinsic" demagnetization curve 200 is illustrated for the same magnet.

Demagnetization curves indicate the behavior of a magnet for a given temperature and indicates how demagnetization may occur in the presence of a specific magnetic field. The normal demagnetization curve 205 shows a knee point 208. As long as the magnetic field is in the linear zone 207 of the curve, the properties of the magnet will return to the original strength. However, if the magnetic field is above the knee point 208, then, in the absence of the magnetic field, the magnet will not return to its original strength, i.e. its original magnetic remanence. Rather, the line 209 indicates how the magnet will return to a lower magnetic remanence, i.e. the magnet has been partially demagnetized.

A high magnetic field able to partially or completely demagnetize may be caused e.g. by electrical faults in the generator.

Different demagnetization curves exist for a given magnet for different temperatures. At higher temperatures, the knee point is reached at a lower magnetic field, i.e. demagnetization will occur more easily.

Figure 4B:
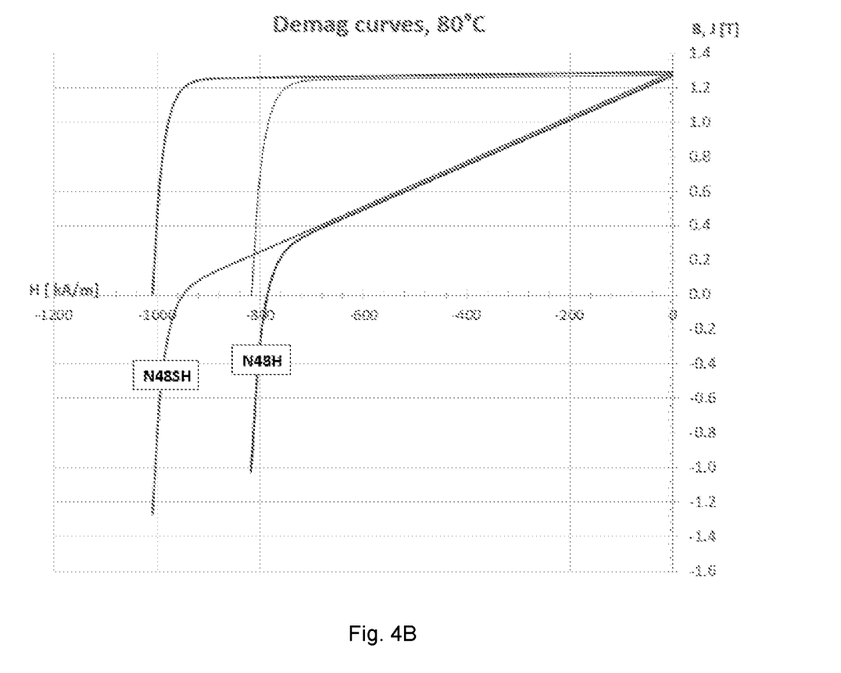

FIG. 4B schematically illustrates demagnetization curves 205, 207 for two types of permanent neodymium magnets with the same strength, i.e. the same magnetic remanence.

However, the magnets have a different temperature rating i.e. a different intrinsic coercivity. Curve 207 (and curve 202) is a demagnetization curve for a permanent magnet with a higher temperature rating N48SH, and curve 205 (and curve 200) is a demagnetization curve for a permanent magnet with a lower temperature rating N48H.

The demagnetization curves 205, 207 show the demagnetization for a temperature of 80° C. Irreversible demagnetization for permanent magnets N48SH is shown to occur at a higher magnetic field.

In as aspect of the present disclosure (with reference to FIG. 3), a rotor 20 for an electrical machine 10 comprising a first type of permanent magnets, and a second type of permanent magnets is provided. The first and the second types of permanent magnets have a same magnetic strength, and the first type of permanent magnets has a first temperature rating, and the second type of permanent magnets has a second temperature rating different from the first temperature rating.

In the example of FIG. 3, the electrical machine may comprise a first set of permanent magnets (of the first type), and a second set of permanent magnets (of the second type). I.e. discrete separate magnets may be used. In other examples, the magnetic material may be provided with additive manufacturing. In such examples, a variation of magnet grade (and in particular temperature rating) may be more continuous.

The permanent magnets may be made from rare earth materials, and specifically may be neodymium iron boron magnets. In alternative examples, the permanent magnets may be made of e.g. ceramic materials, Samarium Cobalt, or Alnico (Alnico is a family of iron alloys which in addition to iron are composed primarily of aluminium (Al), nickel (Ni) and cobalt (Co).

In examples, the rotor 20 may have a radial rotor rim and axially extends from a first end 102 to a second end 101, and wherein the first set of permanent magnets are arranged in a first zone of the rotor, the second set of permanent magnets are arranged in a second zone of the rotor, wherein the first zone is closer to the first end 102 than the second zone.

The rotor in this example is configured to be arranged in the electrical machine 10 in such a way that the first end 102 is nearer to a cooling air supply 73 than the second end 101.

In some examples, the rotor may further comprise a third set of permanent magnets, wherein the third set of permanent magnets have the same magnetic strength and have a third temperature rating different from the first and second temperature ratings. In these examples, three different temperature zones may be defined, and for each of these zones, suitable permanent magnets may be selected. In further examples, four, five, or more different sets of permanent magnets may be provided.

In examples, wherein magnetic material is provided with 3D printing or additive manufacturing, a concrete number of magnet types (temperature rating) may be provided, or a continuous variation of temperature rating could be provided.

In a further aspect, an electrical machine 10 comprising such a rotor is provided. The electrical machine 10 may be a generator. In yet a further aspect, a wind turbine 160 comprising a tower 170, a nacelle 161 rotatably mounted on the tower 170, and a wind turbine rotor 115 including a plurality of blades 120, wherein the wind turbine rotor 115 is operatively connected to a rotor of a generator, wherein the rotor is a rotor as herein described.

Figure 5A:
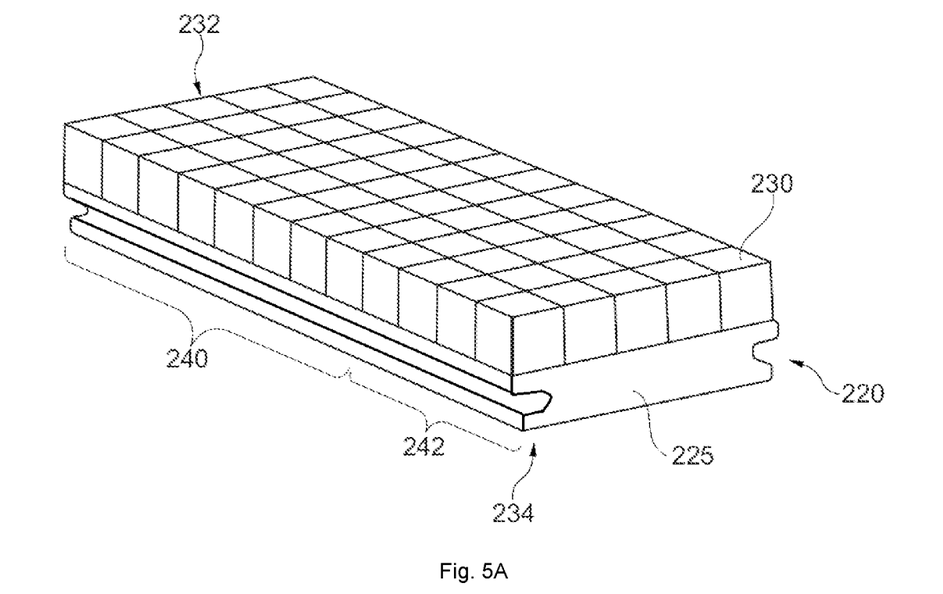
FIGS. 5A and 5B schematically illustrates two examples of permanent magnet modules.
Figure 5B:
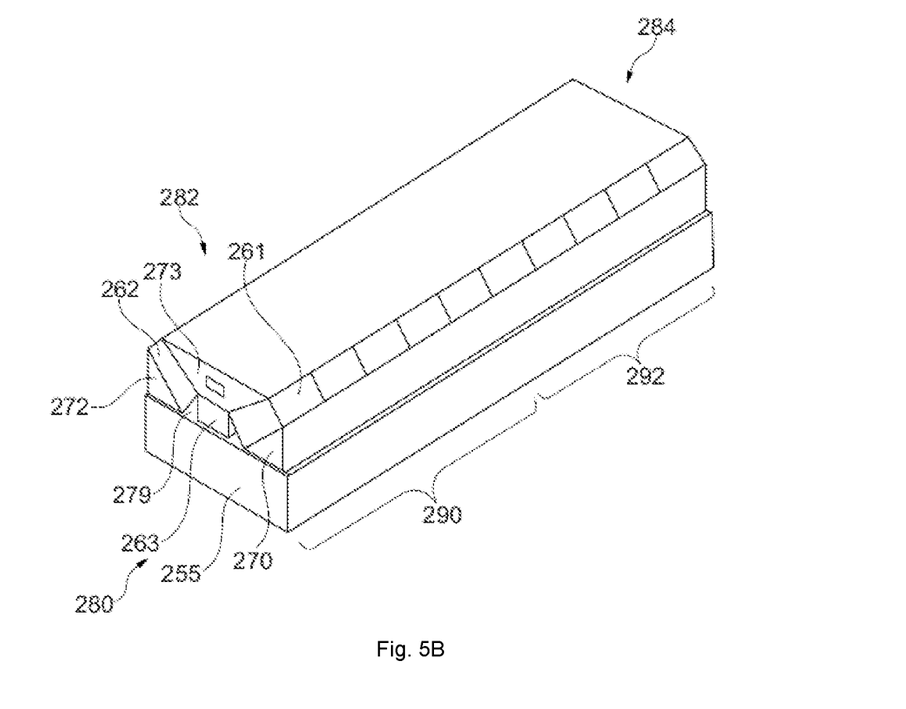

FIGS. 5A and 5B schematically illustrates two examples of permanent magnet modules for rotors of an electrical machine. FIG. 5A illustrates an example of a permanent magnet module 220 having a base 225. The base may be attached to a rotor rim. The base may be attached e.g. with T-shaped anchors that fit inside a recess on either side of the base 225. A plurality of permanent magnets 230 may be arranged on top of the base 225.

The permanent magnet module 220 in this example may have a same length of the rotor, i.e. the permanent magnet module extends from a first (front) side of the rotor to a second (rear) side of the rotor. A first side 232 of the rotor (and the permanent magnet module 220) may be a cold side, and a second side 234 may be a warm side. In operation, the average temperature of the magnets on the cold side 232 may be lower than the average temperature on the warm side.

A first zone 240, with a lower average temperature may be defined, and a second zone 242 with a higher average temperature may be defined. The magnets 230 in the first zone 240 may be different from the magnets 230 in the second zone 242.

An electrical machine comprising a rotor comprising a plurality of permanent magnets, a stator comprising a plurality of electrical coils, and a radial air gap between the rotor and the stator is provided. The plurality of permanent magnets includes a first group of magnets and a second group of magnets, wherein the first group of magnets has a first intrinsic coercivity and the second group of magnets has a second, different, intrinsic coercivity. The first group of magnets may be arranged in the first zone 240, and the second group of magnets may be arranged in the second zone 242.

In examples, the first and the second groups of magnets have the same magnetic remanence.

In some examples, the electrical machine may further comprise a cooling supply for supplying cooling air to the radial air gap, and wherein the first group of magnets is closer to the cooling supply than the second group of magnets. The first intrinsic coercivity may be lower than the second intrinsic coercivity.

In some examples, the rotor comprises a rotor rim, and a plurality of permanent magnet modules attached to the rotor rim.

In some examples, the plurality of permanent magnet modules includes a first group of permanent magnet modules and a second groups of permanent magnet modules, and the first group of permanent magnet modules comprises the first group of magnets, and the second group of permanent magnet modules comprise the second group of magnets. The magnet modules do not necessarily have the same axial length as the rotor. In examples, two magnet modules may be arranged axially behind each other. One of the magnet modules may have the first group of magnets, and the other magnet module may have the second group of magnets.

FIG. 5B schematically illustrates another example of a permanent magnet module 250. The permanent magnet module 250 has a substantially V-shaped magnet portion in an axial cross-section. The permanent magnet module 250 for an electrical machine extends along an axial direction. As before, the temperature distribution may be axially inhomogeneous. There may be a cold side 282 and a warm side 284.

The module 250 comprises a permanent magnet assembly comprising at least one permanent magnet and a base 255 supporting at least part of the permanent magnet assembly. The base extends from a bottom adapted to be positioned on a rotor of an electrical machine (not shown) to a top along a radial direction (along line A-A). The permanent magnet assembly comprises a first inclined permanent magnet portion 261 ("first leg" of the V-shape) and a second inclined permanent magnet portion 262 ("second leg" of the V-shape) arranged outwardly inclined along the radial direction (along line A-A) and a tangential permanent magnet portion 263 arranged parallel with respect to a tangential direction (along line B-B), the tangential direction being substantially perpendicular to the radial direction.

In the example of FIG. 5B, the permanent magnet assembly includes the first inclined permanent magnet portion 261 comprising a first permanent magnet, the second inclined permanent magnet portion 262 comprising a second permanent magnet and a tangential permanent magnet portion 263 comprising a third permanent magnet. In addition, the permanent magnet module may comprise several first permanent magnets 261 arranged along the axial direction in a row or second permanent magnets 262 arranged along the axial direction in a row or third permanent magnets 263 along the axial direction in a row. Specifically, the axial length of these magnets may be similar.

Several permanent magnet modules may be arranged axially behind one another to cover the axial length of the electrical machine.

In the example of the FIG. 5B, the permanent magnet module 250 further comprises a base supporting at least partially the permanent magnets and extending from a bottom adapted to be positioned on a rotor of an electrical machine to a top along a radial direction; wherein the first permanent magnet 261 and the second permanent magnet 262 are arranged outwardly inclined along the radial direction; and the third permanent magnet 263 is arranged substantially parallel to the tangential direction, the tangential direction being substantially perpendicular to the radial direction.

The first and second permanent magnets may be substantially rectangular in an axial cross-section. Alternatively or additionally, the first permanent magnet 261 and the second permanent magnet 262 may have a substantially trapezoidal cross-section. In this way, the fixation of the magnets to the base is improved and thus the risk of an accidental detachment of such magnets may be reduced.

Additionally, the third permanent magnet 263 may have a rectangular cross-section. In other examples, the third permanent magnet 263 may have a rectangular cross-section with beveled edges.

The example of FIG. 5B shows a base 255 comprising an upper pole piece 273 and a first lateral wing 270 and a second lateral wing 272. The permanent magnet assembly may be arranged between the upper pole piece 273 and the first lateral wing 270 and the second lateral wing 272. In this example, the upper pole piece 273 has a substantially trapezoidal axial cross-section comprising a long side parallel to a short side and a first lateral side and a second lateral side connecting the long side to the short side. In this example, the third permanent magnet 263 is attached to the short side of the upper pole piece, the first permanent magnet 261 is attached to the first lateral side of the upper pole piece and the second permanent magnet portion 262 is attached to the second lateral side of the upper pole piece.

In this example, the first lateral wing 261 and the second lateral wing 262 have a substantially right triangular cross-section.

As in the example of FIG. 5A, the base may further comprise lateral recesses extending along the axial direction. Suitably shaped anchors may engage the shape of such lateral recesses and then may be used for the fixing the permanent magnet module to the rotor rim.

In some examples, the base may include a cooling channel 279 for cooling the magnets in order to avoid overheating of the magnets that reduces the efficiency of the electrical machine.

There may be a cold side 282 and a warm side 284. The magnets 261, 262, 263 may vary along the axial direction. The colder zone 290 of the permanent magnet module may have magnets of a lower "grade" and the warmer zone 292 may have magnets of a higher "grade". Specifically, the strength of the magnets may be the same, but the temperature rating may be higher for the magnets in the warmer zone 292.

In some examples, one or more of the permanent magnet modules comprises a magnet of the first type, and a magnet of the second type. The magnet types within a permanent magnet module may be varied in an axial direction in line with the previous description.

With reference to the example of FIG. 5B in particular, the permanent magnet modules include one or more inclined magnets 261, 262, which are arranged inclined with respect to a radial direction, and one or more tangential magnets 263, which are arranged perpendicular to the radial direction, and the inclined magnets 261, 262 may be magnets of the first type, and the tangential magnets 263 may be magnets of the second type.

In this example, the inclined magnets may have a lower temperature rating, than the horizontal magnets. In operation, the temperature of the various magnets in an axial plane may actually be quite homogeneous i.e. there may be little difference in temperature within magnets in the same axial plane. But in the arrangement illustrated in FIG. 5B, the magnetic field may be stronger for the tangential magnet 263 than for the inclined magnets. E.g a magnetic field capable of demagnetizing in case of an electrical fault may be more readily demagnetize the tangential magnet 263 than the inclined magnets 261, 262. For this reason, the temperature rating or intrinsic coercivity for the tangential magnet 263 may be selected to be higher than for the inclined magnets.

The magnets of the first type may have a lower temperature rating such as N48H, and the magnets of the second type in these examples may be e.g. N48SH.

Both the variation in magnet types along the axial direction and the differentiation within a permanent magnet module may also be combined.

Figure 6:
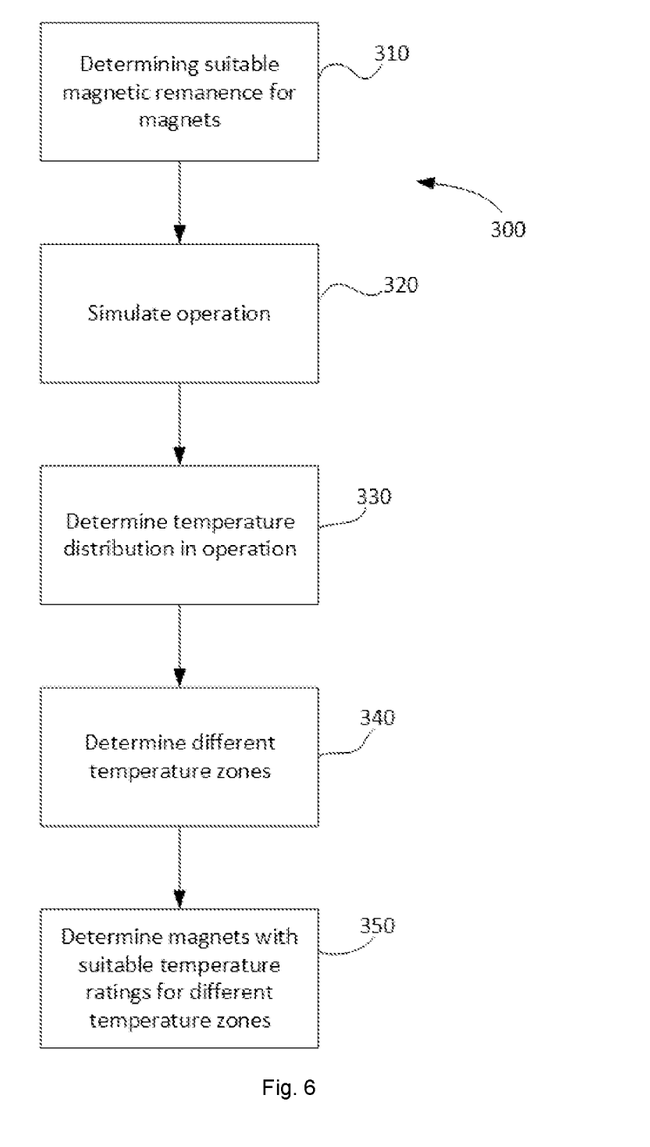
FIG. 6 schematically illustrates an example of a method for selecting suitable permanent magnets for a rotor of an electrical machine.

FIG. 6 schematically illustrates an example of a method 300 for selecting magnets for a permanent magnet rotor of an electrical machine. The method comprises determining a magnetic remanence 310 for the permanent magnets. Depending on the nominal power for the generator, the number and size of magnets etc., the suitable strength for the permanent magnets may be determined. All magnets of the permanent magnet rotor may have the same strength.

The method further comprises determining 330 a temperature distribution of the permanent magnet rotor in operation. Determining a temperature distribution may include simulating 320 the operation of the electrical machine.

The method further comprises determining 340 a first zone of the permanent magnet rotor with a lower average temperature, and determining a second zone of the permanent magnet rotor with a higher average temperature. Based on the temperature distribution, two or more zones of the permanent magnet rotor may be defined. In some examples, the first zone has an average temperature of 10-40° C. higher than the second zone.

The method of this example further comprises selecting a first type of magnet for the first zone and selecting a second type of magnet for the second zone, wherein the second type is different from the first type.

In some examples, the first type of magnet may have a lower temperature rating than the second type of magnet, because the first zone has a lower average temperature in operation. This may occur e.g. if the first zone is arranged closer to a cooling air supply.

In some examples, only magnets of the first type or of the second type are selected. I.e. there are only two temperature zones defined. In many implementations it has been found that two temperature zones are sufficient for optimizing cost and avoiding demagnetization.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A rotor for an electrical machine, comprising:
a first type of permanent magnets, and a second type of permanent magnets, wherein the first and the second types of permanent magnets have a same magnetic strength;
wherein the first type of permanent magnets has a first temperature rating, and the second type of permanent magnets has a second temperature rating different from the first temperature rating;
a radial rotor rim, and a plurality of permanent magnet modules, each permanent magnet module comprising a base that attaches to the rotor rim; and
the permanent magnet modules comprising a first magnet zone with at least one of the first type of permanent magnet arranged on the base, and a second magnet zone with at least one of the second type of permanent magnet arranged on the base.

2. The rotor according to claim 1, wherein the first and second types of permanent magnets are made from rare earth materials.

3. The rotor according to claim 1, wherein the radial rotor rim axially extends from a first end to a second end, and wherein the first magnet zone is closer to the first end than the second magnet zone.

4. The rotor according to claim 3, wherein the rotor is configured to be arranged in the electrical machine in such a way that the first end is nearer to a cooling air supply than the second end.

5. The rotor according to claim 3, wherein the permanent magnet modules further comprise a third magnet zone of a third type of permanent magnets, wherein the third type of permanent magnets have the same magnetic strength and have a third temperature rating different from the first and second temperature ratings.

6. An electrical machine comprising a rotor according to claim 1.

7. The electrical machine according to claim 6, wherein the electrical machine is a generator.

8. A wind turbine comprising a tower, a nacelle rotatably mounted on the tower, and a wind turbine rotor including a plurality of blades, wherein the wind turbine rotor is operatively connected to a generator rotor, wherein the generator rotor comprises a rotor according to claim 1.

9. An electrical machine, comprising:
a rotor comprising a plurality of permanent magnets;
a stator comprising a plurality of electrical coils;
a radial air gap between the rotor and the stator;
wherein the plurality of permanent magnets includes a first group of magnets and a second group of magnets, wherein the first group of magnets has a first intrinsic coercivity and the second group of magnets has a second, different, intrinsic coercivity, and wherein the first and the second groups of magnets have the same magnetic remanence;
the rotor comprising a rotor rim, and a plurality of permanent magnet modules each having a base attached to the rotor rim; and
each of the permanent magnet modules comprising a first magnet portion with at least one of the first group of magnets arranged on the base and a second magnet portion with at least one of the second group of magnets arranged on the base.

10. The electrical machine according to claim 9, further comprising a cooling supply for supplying cooling air to the radial air gap, and wherein the first group of magnets is closer to the cooling supply than the second group of magnets.

11. The electrical machine according to claim 10, wherein the first intrinsic coercivity is lower than the second intrinsic coercivity.

12. The electrical machine according to claim 9, wherein the permanent magnets of the first group of magnets are arranged inclined with respect to a radial direction, and the permanent magnets of the second group of magnets are tangential magnets arranged perpendicular to the radial direction.

\* \* \* \* \*